Dec. 27, 1955 F. A. SCHUMACHER 2,728,198
PLURAL TEMPERATURE REFRIGERATING SYSTEM
Filed Dec. 12, 1952 2 Sheets-Sheet 1
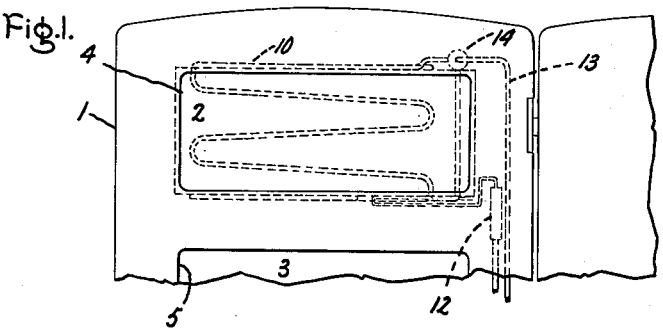
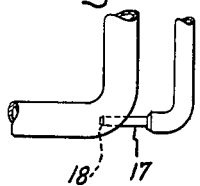
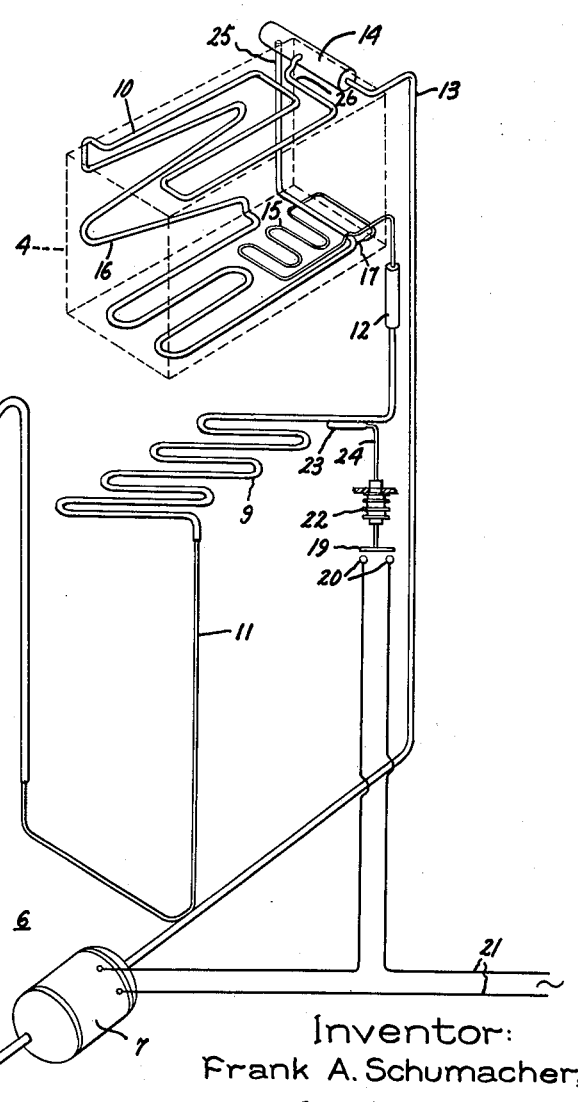
Inventor:
Frank A. Schumacher,
by [signature]
His Attorney.

Dec. 27, 1955  F. A. SCHUMACHER  2,728,198
PLURAL TEMPERATURE REFRIGERATING SYSTEM
Filed Dec. 12, 1952  2 Sheets-Sheet 2
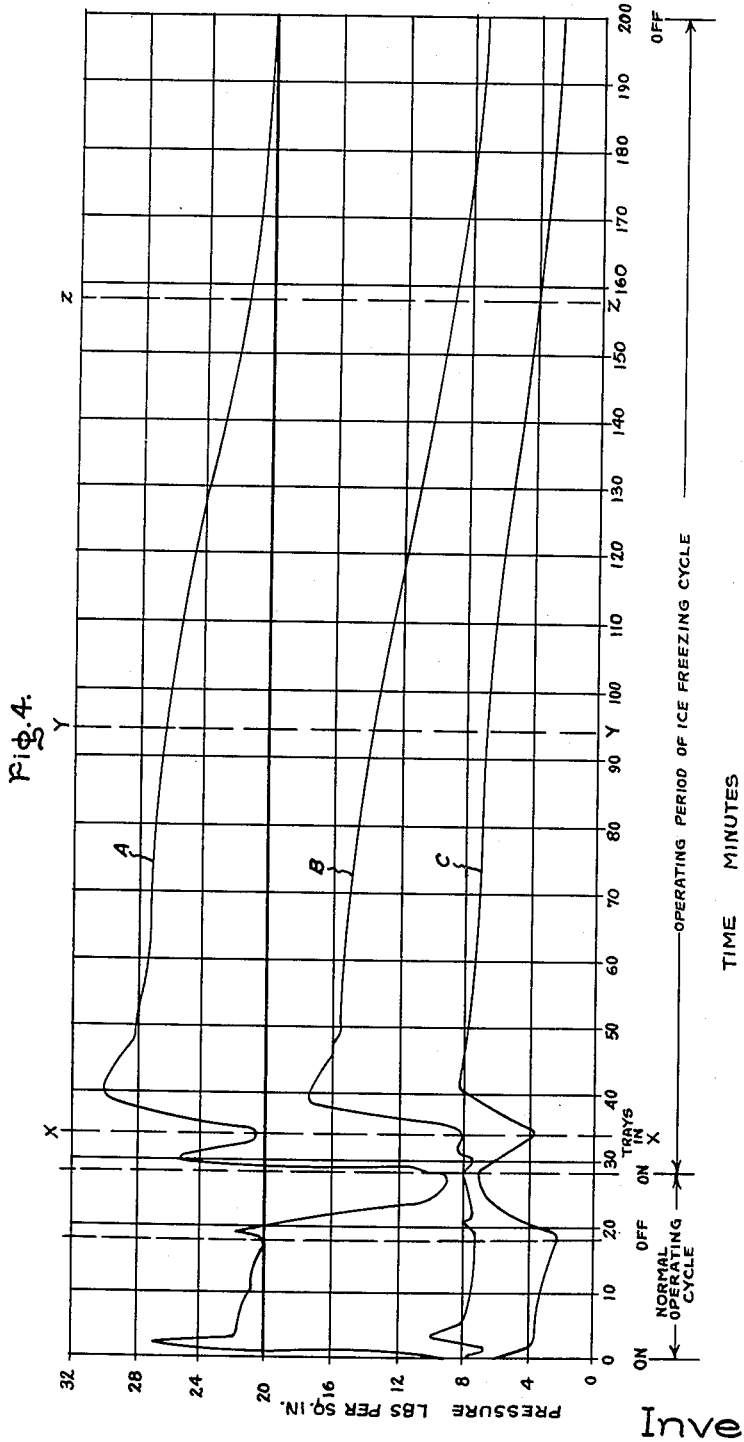
Inventor:
Frank A. Schumacher,
by /s/ ......
His Attorney.

United States Patent Office 2,728,198
Patented Dec. 27, 1955

2,728,198
PLURAL TEMPERATURE REFRIGERATING SYSTEM

Frank A. Schumacher, Erie, Pa., assignor to General Electric Company, a corporation of New York Application December 12, 1952, Serial No. 325,634

5 Claims. (Cl. 62—4)

My invention relates to refrigerating systems, and more particularly to refrigerating systems including a plurality of evaporators arranged to operate at different temperatures.

In present-day refrigerators, one of the functions to be performed is the making of ice cubes by the freezing of water in suitable trays. It is desirable to have a relatively rapid freezing of water so that the making of ice cubes will not require an unduly long period of time. By my invention, the placing of trays of water in the refrigerator has the automatic effect of prolonging the running time of the refrigerating unit so as to accelerate the freezing of water in the trays.

Accordingly, it is an object of my invention to provide a refrigerating system including an improved arrangement for securing rapid ice freezing.

It is another object of my invention to provide a refrigerating system including an ice freezing section and including an improved arrangement for providing conditions for accelerating ice freezing.

It is a further object of my invention to provide a refrigerator incorporating two-temperature refrigerating system including an ice freezing section and including an improved arrangement for automatically providing conditions for faster ice freezing when trays of water to be frozen are placed in the refrigerator.

Further objects and advantages of my invention will become apparent as the following description proceeds, and the features of novelty which characterize my invention will be pointed out with particularity in the claims annexed to and forming part of this specification.

In carrying out the objects of my invention, a refrigerating system is employed which includes a high temperature evaporator and a low temperature evaporator, and a device for maintaining a predetermined pressure, and hence temperature, differential between these evaporators. An ice freezing section is provided between the pressure differential device and the major portion of the low temperature evaporator. This ice freezing section is connected to the major portion of the low temperature evaporator through a restricted conduit.

For a better understanding of my invention, reference may be had to the accompanying drawing in which Fig. 1 is a view of a portion of a refrigerator incorporating an embodiment of my invention.

Fig. 2 is a schematic illustration of a refrigerating system employed in the refrigerator of Fig. 1.

Fig. 3 is an enlarged view of a portion of the system shown in Fig. 3.

Fig. 4 is a graph showing pressure relationships at different points in the refrigerating system under different conditions.

Referring to the drawing, there is shown a two-temperature refrigerator 1 which includes a frozen food compartment 2 and a fresh food compartment 3. The frozen food compartment 2 is defined by a liner 4. The fresh food compartment 3 is defined by a liner, a portion of which is shown at 5.

In order to refrigerate these compartments and also to provide for ice freezing, the refrigerating system shown schematically in Fig. 2 is employed. This refrigerating system includes a condensing unit 6 which comprises a motor-compressor unit within a hermetically sealed case 7, and a condenser 8. The refrigerating system further includes a high temperature evaporator 9, which is adapted to be disposed within the fresh food compartment 3 for cooling this compartment, and a low temperature evaporator 10. The low temperature evaporator comprises tubing arranged in generally serpentine form and secured, in a manner well known in the art, to the exterior of the liner 4 in any suitable manner, as by brazing thereto.

Liquid refrigerant is supplied from the condenser 8 through a capillary tube 11 to the high temperature evaporator 9. The exit of the high temperature evaporator 9 is connected to a pressure differential device 12 for maintaining a predetermined normal pressure, and hence temperature, differential between the high temperature evaporator 9 and the low temperature evaporator 10. This device may be of any suitable type; for example, it may be a pressure differential valve of the type disclosed in the copending application of Daniel S. Dickinson Serial No. 252,136, filed October 19, 1951 (now Patent 2,695,627), and assigned to the same assignee as the present invention. Vaporized refrigerant is returned to the motor-compressor unit through a suction line 13 from a header 14 of the low temperature evaporator. Thus, the condensing unit, the high temperature evaporator 9 and the low temperature evaporator 10 are connected in series refrigerating circuit. The refrigerating system is charged with a suitable vaporizable refrigerant, for example, a dichlorodifluoromethane refrigerant sold under the trade name Freon-12.

The low temperature evaporator 10 includes an ice freezing section 15 immediately following the pressure differential device 12, and a second section 16 following the ice freezing section 15 in the refrigerating circuit. Since both the ice freezing section 15 and the second section 16 are employed for cooling the frozen food compartment 2, they are discussed hereinafter as two sections of the low temperature evaporator. However, alternatively, they may be regarded as an ice freezing section followed by a low temperature evaporator; in this case, the refrigerating system would be considered to include the high temperature evaporator, pressure differential device, ice freezing section, and low temperature evaporator connected in that order in a series refrigerating system.

In the form of invention illustrated, the tubing comprising the ice freezing section 15 is brazed to the exterior of the bottom wall of the liner 4 near one corner of the compartment 2. The tubing which comprises the section 16 is brazed to the bottom, back and top walls of the liner 4, and may, if desired, be extended also to the two side walls. The location of the ice freezing section 15, as indicated above, is such that freezing trays can readily be placed on the bottom wall of the liner 4 in the region of the ice freezing section 15, and hence in heat exchange relationship therewith. If desired, the ice freezing section could, of course, be brazed to a shelf disposed within the frozen food compartment 2 so as to provide a specific refrigerated shelf for the disposition of freezing trays thereon.

It is desirable to provide for a rapid freezing of the water in the freezing trays to make ice cubes. In accordance with my invention, accelerated freezing of the water is accomplished by providing between the ice freezing section 15 and the second section 16 of the low temperature evaporator 10, a restricted conduit or restrictor 17, i. e., a conduit of sufficiently small diameter that it offers a substantial resistance to flow of gaseous refrigerant therethrough while offering a materially smaller resistance to flow of liquid refrigerant therethrough. By way of example, I have employed tubing of approximately 0.17 inch inside diameter for the ice freezing section 15 and tubing approximately 0.3 inch inside diameter for the section 16, while utilizing tubing of approximately .083 inch inside diameter and 5½ inches in length for the restricted conduit 17. The end of the restricted conduit 17 is connected into the second section 16 of the low temperature evaporator in the form of an injector, as indicated at 18. While in the specific embodiment disclosed the section 15 is made of tubing having a smaller diameter than section 16, the tubing of the section 15 may, if desired, be of the same diameter as that of section 16.

The provision of the restricted conduit 17 between the ice freezing section 15 and the second section 16 is effective to cause an accelerated rate of freezing of the water in the freezing trays. When trays of water to be frozen are placed in the frozen food compartment 2 on the bottom wall of the liner 4, in heat exchange proximity to the ice freezing section, a materially increased vaporization of refrigerant in the ice freezing section 15 results. This results, of course, in a much higher percentage of gaseous, as opposed to liquid, refrigerant to be transmitted into the second section 16 through the restricted conduit 17. The restricted conduit 17, because of its size, offers a substantially greater resistance to flow of gaseous refrigerant than to flow of liquid refrigerant. Accordingly, this increase in the percentage of gaseous refrigerant from the ice freezing section 15 causes a substantial increase in the pressure drop across the restricted conduit 17. There is, therefore, a materially greater pressure differential between the high temperature evaporator 9 and the second section 16 under ice freezing conditions than under normal operating conditions.

The operation of the condensing unit 6 is controlled by the switch 19 adapted to engage contacts 20 in a line 21 through which power is supplied to the condensing unit 6. The switch 19 is actuated by a bellows 22 operated in response to the temperature of the high temperature evaporator 9 by means of a thermostatic bulb 23 positioned in contact with the evaporator 9 and connected to the bellows 22 by a tube 24. Accordingly, the operation of the condensing unit 6 is controlled by the temperature and, hence, the corresponding pressure, of the high temperature evaporator 9. A particular limited range of temperature, and hence of pressure, of the high temperature evaporator is therefore established.

The pressure in the low temperature evaporator, and specifically in the second section 16 thereof, and hence the temperature thereof, is determined during normal operation primarily by the pressure differential established by the pressure differential device or valve 12. Accordingly, a predetermined range of temperature is maintained in the frozen food compartment 2 under normal operating conditions. When trays of water to be frozen, however, are placed within the frozen food compartment 2 adjacent the ice freezing section 15 the pressure in the high temperature evaporator 9 is affected in two ways. First, the heat from the water in the freezing trays is transferred to the frozen food compartment through conduction and radiation and results in increase in pressure in the second section 16 of the low temperature evaporator. Secondly, it results in a greatly increased vaporization of refrigerant in the ice freezing section 15 since the freezing trays are disposed immediately adjacent this ice freezing section. Since the restricted conduit 17 offers a much greater resistance to flow of gaseous refrigerant than to flow of liquid refrigerant, this increase in proportion of gaseous refrigerant flowing through the restricted conduit 17 results in a substantially greater pressure drop across this restricted conduit 17. The increase in the pressure of the section 16 of the low temperature evaporator and the increase in pressure drop across the restrictor 17 both combine to increase the pressure in the high temperature evaporator 9, even though the pressure drop across the pressure differential device 12 remains substantially constant under both normal and ice freezing conditions. Accordingly, a substantially longer running time of the condensing unit is required to reduce the temperature of the high temperature evaporator to the predetermined minimum at which the switch 12 is opened to stop the condensing unit. Hence, refrigerant is supplied through the ice freezing section 15 for a substantially greater length of time than would be the case should the restricted section 17 not be employed. Moreover, this increase in running time of the condensing unit is automatically achieved, as indicated above, by the imposition of an ice freezing load on the ice freezing section 15. By way of example, I have found that with a one freezing tray load the use of the refrigerating system of my invention, including the restricted conduit 17, results in an ice freezing rate of 0.75 lb. per hour in a 60° room compared with an ice freezing rate of 0.45 lb. per hour under the same room temperature conditions where a system not including the restricted conduit 17 was employed.

The pressure relationships at different points in the refrigerating system under normal conditions and under ice freezing conditions are illustrated in Fig. 4 through complete cycles of the refrigerating apparatus in order to show graphically the effect of the imposition of an ice freezing load on the running time of the condensing unit. While pressure relationships are utilized in the graph in Fig. 4 because these more clearly illustrate the relationships involving pressure drops through the refrigerating system, it will be understood that the temperatures of the evaporators vary in a corresponding manner. Fig. 4 shows the pressure conditions throughout a normal and an ice freezing cycle at 3 points in the refrigerating system. Thus, curve A illustrates the pressure in the fresh food evaporator 9; curve B illustrates the pressure at the section 15 of the low temperature or freezer evaporator; and curve C illustrates the pressure in the section 16 of the low temperature freezer evaporator. The difference between the pressures shown by curves A and B represents primarily the pressure drop across the pressure differential device 12. The difference between the pressures shown by curves B and C represents primarily the pressure drop across the restrictor 17. These curves are all made from tests in a room having a 100° F. ambient temperature.

Considering first the normal operating cycle at the left end of the graphs, it can be seen that the pressure in the high temperature or fresh food evaporator 9 rises rapidly at the beginning of the operating cycle and then gradually decreases to a pressure of approximately 20 lbs. per sq. in., at which point the operation of the unit is discontinued through the action of the temperature responsive bulb 22 which is responsive to the temperature, and hence the pressure, of the evaporator 9. This operating portion of the cycle under these normal conditions takes approximately 18 minutes. During the idle portion of the cycle the pressures in the system substantially equalize, the pressure in the fresh food evaporator decreasing as shown. This idle portion of the cycle takes approximately 8 minutes. It can be seen by comparison of curves B and C during the operating portion of the normal cycle that the pressure drop through the restrictor 17 remains substantially constant at about 4 to 4½ lbs. per sq. in. Similarly, it can be seen by comparison of curves A and B that the pressure drop through the pressure differential device 12 remains substantially constant at approximately 12 lbs. per sq. in.

Shortly after the beginning of the next operating period (at the point in the cycle indicated by the line x—x in Fig. 4) freezing trays filled with water were placed in the compartment 4 adjacent the ice freezing section 15. The effect of the addition of this heat load in the region of the section 15 is apparent from the curves. It will be noted that within a matter of approximately three minutes after the insertion of the freezing trays the pressure drop through the restrictor 17, i. e., the pressure differential between curves B and C, increases from the 4 to 4½ lb. per sq. in. differential present during normal operating conditions to a differential of approximately 10½ lbs. per sq. in. The pressure drop through the valve, i. e., the pressure differential between the curves A and B still remains substantially constant at approximately 12 lbs. per sq. in. As mentioned in the previous discussion the addition of this heat load in the compartment 4 effects some transfer of the heat to the section 16 of the low temperature evaporator by conduction and radiation causing a pressure rise in the section 16 of the low temperature evaporator above that existing under normal operation conditions, i. e., under conditions in which no ice freezing load is imposed. From curve C it can be seen that this pressure rise occurs within a short period after the insertion of the ice freezing load and amounts to approximately 4½ lbs. per sq. in. Therefore, the pressure in the section 16 is approximately 4½ lbs. per sq. in. higher and the pressure drop through the restrictor 17, as explained above, is approximately 6 lbs. per sq. in. higher, while the pressure drop through the pressure differential device 12 remains the same as under normal operating conditions. The net result is that, within approximately 3 or 4 minutes after the insertion of the ice freezing load the cumulative effect is to raise the pressure in the fresh food evaporator 9 to a value approximately 10 lbs. per sq. in. higher than under normal operating conditions.

Approximately one hour later, as indicated at the line Y—Y in Fig. 4, the pressure drop through the restrictor 17 still stands at better than 6 lbs. per sq. in. compared to the pressure drop of slightly over 4 lbs. per sq. in. under normal operating conditions where no ice freezing load is involved. It has been mentioned above that the control, which is responsive to the fresh food or high temperature evaporator 9, is set to stop the operation of the refrigerating unit when the pressure in the fresh food evaporator reaches a value of approximately 20 lbs. per sq. in. Because of the combination of the heat transferred to the section 16 of the low temperature evaporator and of the increased pressure drop through the restrictor 17, the pressure of the fresh food evaporator 9 is not lowered to this value of 20 lbs. per sq. in. until a very much longer running period than is true under normal operating conditions, i. e. under conditions where no ice freezing load is imposed.

Part of this increase in running time is of course due to the transfer of heat to the section 16 of the low temperature evaporator, raising the pressure thereof, as shown by the curves. However, were it not for the presence of the restrictor 17 and were the pressure drop from the outlet end of the pressure differential device 12 to the section 16 of the low temperature evaporator to remain at its normal operating value of 4 lbs. per sq. in., the pressure in the high temperature evaporator 9 would be correspondingly reduced. It has been mentioned previously that the drop through the pressure differential device 12 remains substantially constant at 12 lbs. per sq. in. under all operating conditions. Adding to this the 4 lbs. per sq. in. drop between the outlet end of the device 12 and the section 16 would give a total pressure drop from the fresh food evaporator to the section 16 of the low temperature evaporator of approximately 16 lbs. per sq. in. Applying this to the graph in Fig. 4 it can be seen that, should the drop from the outlet end of the pressure differential device 12 to the section 16 of the low temperature evaporator have remained constant, the pressure in the fresh food evaporator would have reached the cutoff point of 20 lbs. per sq. in. at slightly over 120 minutes after the beginning of the operating cycle (as indicated at the line Z—Z in Fig. 31 ). The graph shows that at slightly over 120 minutes after beginning of the operating cycle the pressure in the section 16 of the low temperature evaporator is approximately 16 lbs. per sq. in. below the 20 lb. per sq. in. cutoff point, i. e. the pressure in the section 16 is approximately 4 lbs. per sq. in.

However, because of the provision of the restrictor 17 the pressure drop from the outlet end of the pressure differential device 12 to the section 16 of the low temperature evaporator is still something over 5 lbs. per sq. in. rather than 4 lbs. per sq. in. at this time (i. e., at the line Z—Z), and hence the pressure in the fresh food evaporator is correspondingly increased and remains above the cutoff point of 20 lbs. per sq. in. As shown by the graph, it requires approximately another 45 minutes of operating time to bring the pressure of the fresh food evaporator down to the 20 lb. per sq. in. cutoff point. Accordingly, heat is extracted from the water in the freezing trays through this additional 45 minutes, resulting in more rapid freezing thereof. In the absence of the introduction of the restrictor 17 into the circuit the operating period would have terminated at slightly over 120 minutes after the beginning of this operating cycle, i. e. the line Z—Z on the graph, and this would have been followed by an idle period and another short operating period substantially less than 45 minutes, so that a considerable amount of time would elapse before the equivalent in cooling effect of the freezing trays would be reached.

The end of the restricted conduit 17 at the injector 18 is, as explained previously, inserted into the tubing comprising the second section 16 of the low temperature evaporator 10. This section 16 includes a conduit 25 connected to the header 14 below the normal level of liquid refrigerant therein and a conduit 26 connected to this header 14 above the normal level of liquid refrigerant therein. The injector 18 is specifically arranged at the bottom portion of the tubing comprising the section 16, so that it enters the section 16 at a point which has the head of liquid refrigerant in the header and in the generally vertical conduit 25 imposed thereon. This insures that liquid refrigerant is present at the point where the injector 18 enters the section 16 and the injector 18 is inserted in the tubing comprising the section 16 in a direction to assist the desired circulation of refrigerant in the section 16.

While I have shown and described a specific embodiment of my invention, I do not desire my invention to be limited to the particular construction shown and described and I intend by the appended claims to cover all modifications within the spirit and scope of my invention.

What I claim and desire to secure by Letters Patent of the United States is:

1. A refrigerating system comprising a condensing unit, a high temperature evaporator and a low temperature evaporator connected in series refrigerating circuit, control means dependent on a condition of said high temperature evaporator for starting said condensing unit at a high pressure in said high temperature evaporator and stopping said condensing unit at a low pressure in said high temperature evaporator, a vaporizable refrigerant in said system, means in said circuit between said evaporators for maintaining a predetermined normal pressure differential between said evaporators, an ice freezing section in said circuit between said differential means and said low temperature evaporator, said section being arranged for receiving in heat exchange relationship therewith trays of water to be frozen, and means for automatically increasing the pressure differential between said evaporators when an ice freezing load is imposed on said section, said means including a restricted conduit in said circuit between said freezing section and said low temperature evaporator which decreases the flow of refrigerant to said low temperature evaporator upon increased vaporization of refrigerant in said section underice freezing load thereby increasing the pressure of said high temperature evaporator and increasing the running time of said unit.

2. A refrigerating system comprising a condensing unit, a high temperature evaporator and a low temperature evaporator connected in series refrigerating circuit, control means dependent on a condition of said high temperature evaporator for starting said condensing unit at a high pressure in said high temperature evaporator and stopping said condensing unit at a low pressure in said high temperature evaporator, a vaporizable refrigerant in said system, means for maintaining a predetermined normal pressure differential between said evaporators, an ice freezing section in said circuit between said differential means and said low temperature evaporator, said section being arranged for receiving in heat exchange relationship therewith trays of water to be frozen, and means for automatically increasing the pressure differential between said evaporators when an ice freezing load is imposed on said section, said means including a restricted conduit between said freezing section and said low temperature evaporator whereby decreased flow of refrigerant through said restricted conduit upon increased vaporization of refrigerant in said section under ice freezing load is effective to raise the pressure in said high temperature evaporator and thereby increase the time required for the condensing unit to decrease the pressure in the high temperature evaporator to the low pressure value at which said control means stops said unit.

3. A refrigerating system comprising a condensing unit, a high temperature evaporator and a low temperature evaporator connected in series in refrigerating circuit, a vaporizable refrigerant in said system, means for maintaining a predetermined normal pressure differential between said evaporators said low temperature evaporator including an ice freezing section immediately following said differential means and a second section following said ice freezing section, said ice freezing section being arranged for receiving in heat exchange relationship therewith trays of water to be frozen, means dependent on a condition of said high temperature evaporator for starting said condensing unit at a high pressure in said high temperature evaporator and stopping said condensing unit at a low pressure in said high temperature evaporator, means dependent upon the placing of an ice freezing load in heat exchange relationship with said ice freezing section for automatically increasing the pressure differential between said high temperature evaporator and said second section of said low temperature evaporator, said last-named means including a restricted conduit between said ice freezing section and said second section of said low temperature evaporator whereby increased vaporization of refrigerant in said ice freezing section under ice freezing load is effective to decrease flow of refrigerant from said high temperature evaporator, thereby raising the pressure in said high temperature evaporator and increasing the running time of said condensing unit required to lower the pressure of said high temperature evaporator to that at which said unit stops.

4. A refrigerator including a fresh food compartment and a liner defining a frozen food compartment, a refrigerating system for said refrigerator including a condensing unit, a high temperature evaporator for cooling said fresh food compartment and a low temperature evaporator for cooling said frozen food compartment all connected in series refrigerating circuit, control means in said circuit between said high temperature evaporator and said ice freezing section for maintaining a predetermined normal pressure differential between said evaporators, a vaporizable refrigerant in said system, said low temperature evaporator including an ice freezing section receiving refrigerant from said pressure differential means and secured to a lower portion of said liner and a second section receiving refrigerant from said ice freezing section and secured to the remainder of said liner, said lower portion of said liner being arranged to receive trays of water to be frozen, control means dependent on a condition of said high temperature evaporator for starting said condensing unit at a high pressure in said high temperature evaporator and stopping said condensing unit at a low pressure in said high temperature evaporator, and means dependent on the placing of an ice freezing load in heat exchange relationship with said ice freezing section for automatically increasing the pressure differential between said high temperature evaporator and said second section of said low temperature evaporator, said means including a restricted conduit between said ice freezing section and said second section of said low temperature evaporator whereby increased vaporization of refrigerant in said ice freezing section under ice freezing load is effective to increase the pressure of said high temperature evaporator and increase the time required for said unit to decrease the pressure in said high temperature evaporator to the low pressure value at which said control means stops said unit.

5. A refrigerator including a fresh food compartment and a liner defining a frozen food compartment, a refrigerating system for said refrigerator including a condensing unit, a high temperature evaporator for cooling said fresh food compartment and a low temperature evaporator for cooling said frozen food compartment all connected in series refrigerating circuit, a vaporizable refrigerant in said system, said low temperature evaporator including an ice freezing section receiving refrigerant from said high temperature evaporator and secured to a lower portion of said liner and a second section receiving refrigerant from said ice freezing section and secured to the remainder of said liner, said lower portion of said liner being arranged to receive trays of water to be frozen, said second section being arranged to receive heat by conduction and radiation from said trays of water for raising the pressure in said second section, control means dependent on a condition of said high temperature evaporator for starting said condenser unit at a high pressure in said high temperature evaporator and stopping said condensing unit at a low pressure in said high temperature evaporator, means in said circuit between said high temperature evaporator and said ice freezing section for maintaining a predetermined normal pressure differential between said evaporators, and means dependent on the placing of an ice freezing load in heat exchange relationship with said ice freezing section for automatically increasing the pressure differential between said high temperature evaporator and said second section of said low temperature evaporator, said means including a restricted conduit between said ice freezing section and said second section of said low temperature evaporator whereby increased vaporization of refrigerant in said ice freezing section under ice freezing load is effective to increase said pressure differential between said high temperature evaporator and said second section of said low temperature evaporator, said increase in pressure in said second section and said increase in pressure differential combining to raise the pressure in said high temperature evaporator for increasing the running time of said condensing unit required to lower the pressure in said high temperature evaporator to that at which said control means stops said unit.

References Cited in the file of this patent

UNITED STATES PATENTS

| Number | Name | Date |
|---|---|---|
| 2,146,797 | Dasher | Feb. 14, 1939 |
| 2,437,257 | Johnson | Mar. 9, 1948 |
| 2,487,182 | Richard | Nov. 8, 1949 |
| 2,488,161 | Benson et al. | Nov. 15, 1949 |
| 2,539,105 | Rosebrook | Jan. 23, 1951 |
| 2,622,407 | Bixler | Dec. 23, 1952 |